United States Patent [19]
Djermester

[11] Patent Number: 6,167,267
[45] Date of Patent: Dec. 26, 2000

[54] METHOD AND APPARATUS FOR PROCESSING CONTROL SIGNALS IN A MOBILE STATION OF A MOBILE RADIO SYSTEM

[75] Inventor: Roland Djermester, Isen, Germany

[73] Assignee: Siemens Aktiengesellschaft, Munich, Germany

[21] Appl. No.: 09/083,859

[22] Filed: May 22, 1998

[30] Foreign Application Priority Data

May 22, 1997 [DE] Germany ............................ 197 21 500

[51] Int. Cl.[7] ..................................................... H04Q 7/32
[52] U.S. Cl. ............................ 455/434; 455/441; 455/515
[58] Field of Search ..................................... 455/434, 440, 455/441, 515, 550, 573, 575, 68, 69, 437

[56] References Cited

U.S. PATENT DOCUMENTS

| | | | |
|---|---|---|---|
| 5,386,588 | 1/1995 | Yasuda ........................................ | 455/69 |
| 5,432,842 | 7/1995 | Kinoshita et al. ........................ | 455/441 |
| 5,465,389 | 11/1995 | Agrawal et al. .......................... | 455/441 |
| 5,513,380 | 4/1996 | Ivanov et al. ............................. | 455/441 |
| 5,898,926 | 4/1999 | Konishi ..................................... | 455/441 |

*Primary Examiner*—Edward F. Urban
*Attorney, Agent, or Firm*—Herbert L. Lerner; Laurence A. Greenberg; Werner H. Stemer

[57] ABSTRACT

Control signals are processed in a mobile station of a mobile radio system in which control signals are received from one current base station and from other base stations. A reception level of the control signal received from the current base station is determined and evaluated, and a fluctuation value is derived from the control signal received from the current base station. The fluctuation value is compared with a threshold and a decision is made, on the basis of the comparison result, regarding the rate of reception and/or the measurement of the reception level of control signals from the other base stations. The apparatus for processing the control signals includes a receiving device which receives the control signals from the base stations, a determining device which determines the reception level of the control signal received from the current base station, and an evaluation device which evaluates the reception level. The evaluation device defines a fluctuation value on the basis of the reception level, compares the fluctuation value with the predetermined threshold value, and defines the rate at which the control signals are received from the other base stations and/or the measurement of the reception level of the control signals from the other base stations.

11 Claims, 1 Drawing Sheet

METHOD AND APPARATUS FOR PROCESSING CONTROL SIGNALS IN A MOBILE STATION OF A MOBILE RADIO SYSTEM

BACKGROUND OF THE INVENTION

Field of the Invention

The present invention relates to a method and an apparatus for processing control signals in a mobile station of a mobile radio station, where control signals are received from one current base station and from other base stations.

Methods and apparatus of that type are generally known from the prior art. In mobile radio systems, such as GSM (Global System for Mobile Communications), PCN (Personal Communication Network), PCS (Personal Communication System) and DECT (Digital European Cordless Telephone) systems, and so forth, control signals from the base station of the cell in which the mobile stations are located and from the base stations of other, for instance adjacent cells, are received at regular intervals by the mobile stations, especially when they are in the idle mode. For instance, in the GSM system, a mobile station in the idle mode regularly measures the reception field intensity or reception level of the BCCH channels (Broadcast Control Channels) from up to 32 different base stations.

The BCCH is unidirectional from the respective base stations to the mobile station. Each cell of a mobile radio network is assigned one base station, which supplies the region of the cell with BCCH information. If a mobile station, such as a mobile phone, is registered in the mobile radio network, then in addition to the BCCH information it receives other information relating to whether a call for that mobile station is present. The better the reception quality, the better can the mobile station decipher this information, and the higher the availability and accessibility of the mobile station.

In the GSM system, for instance, it is the task of the applicable mobile station to listen to precisely that cell or base station from which it expects the best reception quality. The best criterion for the reception quality is the reception level of the receive signals. Therefore, at those times at which the mobile station is not receiving any BCCH information from the current base station in the cell where it is located, the mobile station measures the reception level of control signals, such as BCCH signals, of adjacent base stations. After that, the mobile station compares the reception level of the control signals of the adjacent, other base stations with the reception level of the control signals or BCCH signals of the current base station. If the mobile station ascertains that the reception level of the control signals of another base station is higher than the reception level of the control signals of the current base station, then it switches over to the base station, whose control signals are at a higher level. The faster the base station detects these different levels, the better the accessibility.

On the one hand, it is accordingly a goal to measure the reception levels of the control signals of the other base stations as often as possible; on the other hand, each time this consumes power in the mobile station for receiving the control signals of the other base station or measuring its reception level, since the receiving device of the mobile station must be turned on during this time period. The two goals of low current consumption and optimal reception quality or accessibility of the mobile stations are thus mutually contradictory. As already noted above, in conventional mobile stations, comparisons of the reception levels of the control signals of the current base station with the reception levels of the control signals of other, adjacent base stations are performed at regular time intervals. These comparisons are performed even when the mobile station is not in motion, which makes for unnecessary current consumption in the mobile stations. This is particularly disadvantageous if the mobile station is battery-operated.

SUMMARY OF THE INVENTION

It is accordingly an object of the invention to provide a method and an apparatus for processing control signals in a mobile station of a mobile radio station, which overcomes the above-mentioned disadvantages of the prior art devices and methods of this general type and which enables a reduction in current consumption while simultaneously assuring optimal reception quality.

With the foregoing and other objects in view there is provided, in accordance with the invention, a method of processing control signals in a mobile station of a mobile radio system, in which control signals are received from a current base station and from other base stations, which comprises:

determining and evaluating a reception level of a control signal received from a current base station;

deriving a fluctuation value from the control signal received from the current base station;

comparing the fluctuation value with a preset threshold value; and defining, based on a result obtained in the comparing step, one of a rate of reception and a rate of measuring the reception level of control signals from other base stations.

In accordance with an added feature of the invention, the rate of reception of the control signals from the other base stations is selectively reduced and increased if the fluctuation value is less than the preset threshold value or the fluctuation value exceeds the preset threshold value.

In accordance with an additional feature of the invention, the rate of measuring the reception level of the control signals from the other base stations is reduced or increased if the fluctuation value is less than the preset threshold value or the fluctuation value exceeds the preset threshold value.

In accordance with another feature of the invention, the step of determining the fluctuation value comprises deriving the fluctuation value from a modulation value, determined in an A/D converter, of the reception level of the control signal received from the current base station.

In accordance with a further feature of the invention, the fluctuation value is increased by a first amount if the fluctuation value of a preceding evaluation is less than the modulation value of a current evaluation; and the fluctuation value is reduced by a second amount if the fluctuation value of the preceding evaluation is greater than the modulation value of the current evaluation, whereby the first amount is greater than the second amount. In particular, the first amount and the second amount are greater for a higher fluctuation value than for a lower fluctuation value in the preceding evaluation.

With the above and other objects in view there is also provided, in accordance with the invention, an apparatus for processing control signals in a mobile station of a mobile radio system receiving control signals from a current base station and from other base stations, comprising:

a receiving device for receiving control signals from a current base station and from other base stations;

a determining device connected to the receiving device for determining a reception level of the control signal received from the current base station; and an evaluation device connected to the determining device for evaluating the reception level, the evaluation device deriving a fluctuation value from the reception level, comparing the fluctuation value with a predetermined threshold value, and defining, based on a result of the comparison, one of a rate of reception of control signals and a measurement of the reception level of the control signals from the other base stations.

In accordance with again an additional feature of the invention, the evaluation device reduces or increases the rate of reception and/or the measurement of the reception level of control signals from other base stations if the fluctuation value lies below or exceeds the predetermined threshold value.

In accordance with again another feature of the invention, the determining device is an A/D converter, and the evaluation device defines the fluctuation value on the basis of a modulation value of the reception level determined in the A/D converter. The evaluation unit can increase the fluctuation value by a first amount if the fluctuation value of a preceding evaluation is less than the modulation value of the current evaluation, and can reduce the fluctuation value by a second amount if the fluctuation value of the preceding evaluation is greater than the modulation value of the current evaluation, the first amount being greater than the second amount. Moreover, the first and second amounts, for a higher fluctuation value of the preceding evaluation, may be greater than for a lower fluctuation value of the preceding evaluation.

The method and the apparatus according to the invention for processing control signals in a mobile station of a mobile radio system make it possible in particular to control the rate (frequency) of the reception and/or measurement of the reception level of control signals from other base stations as a function of the reception level of the control signals of the current base station. Since in the standby mode of a mobile station, for instance, static conditions prevail for over 70% of the operating time, in other words conditions in which the mobile station is not in motion, it is possible for rate of reception and/or measurement of the reception level of control signals from other base stations to be reduced markedly, sometimes down to zero. The result, of course, is a considerable current-saving effect in the mobile station.

In general in mobile radio systems, two different kinds of reception conditions can be distinguished. In the first kind, there are a plurality of reception paths of multi-path propagation, with a similar level in the mobile station. The space between the current base station and the mobile station presents many opportunities for reflection, for instance from buildings, automobiles, trees, furniture, and so forth.

In the second kind, one of the reception paths is highly predominant while the others are negligible. The space between the base station and the mobile station here offers hardly any possibilities of reflection, for instance in open country. The particular kind of reception condition is therefore dependent on the three-dimensional surroundings of the mobile station and thus applies to all channels in the same way, that is, both for the current base station in the immediate cell and for the other base stations in the neighboring cells.

In the first kind of above-defined reception conditions, the reception level varies if the mobile station itself is in motion or if objects that affect at least one of the dominant reception paths are in motion. Depending on the method by which the reception level is measured and processed for the current base station, the reception level can vary by an order of magnitude between +10 dB and −10 dB from one measurement to another; otherwise, the processed reception level remains constant. By observing the fluctuation in the processed reception levels, or more specifically the processed modulation at the A/D converter of the mobile station for the current base station, it is possible with great certainty to detect whether the reception levels of the control signals from the adjacent, other base stations are varying or constant at that moment. If unchanged reception levels of the control signals arriving from the current base station are ascertained in the mobile station, then the rate with which the reception levels of the control signals from the other base stations are measured can be reduced, and thus less current is consumed for the same accessibility. Since moreover the reception levels of the control signals of the current base station are measured far more often in the mobile station than the reception levels of the control signals of the other, adjacent base stations, enough time still remains to detect changing level conditions in the control signals from the current base station.

In the second kind of reception conditions, the reception levels of the control signals of the current base station cannot vary suddenly but instead vary only very slowly, since the damping of the quasi-direct path varies only with the distance between the current base station and the mobile station. In this case, it is already sufficient to observe the reception levels of the control signals from the other base station only at relative long time intervals.

The A/D converter in which the modulation value of the reception level of the control signal received from the current base station is defined is already present in conventional mobile stations, in which it is used for analog/digital conversion of the signals received in the reception unit of the mobile station and thereupon amplified in the reception amplifiers. This feature of the present invention thus has the major advantage that it can be implemented in conventional mobile stations without additional components and consequently at little additional expense.

Other features which are considered as characteristic for the invention are set forth in the appended claims.

Although the invention is illustrated and described herein as embodied in a method and apparatus for processing control signals in a mobile station of a mobile radio system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
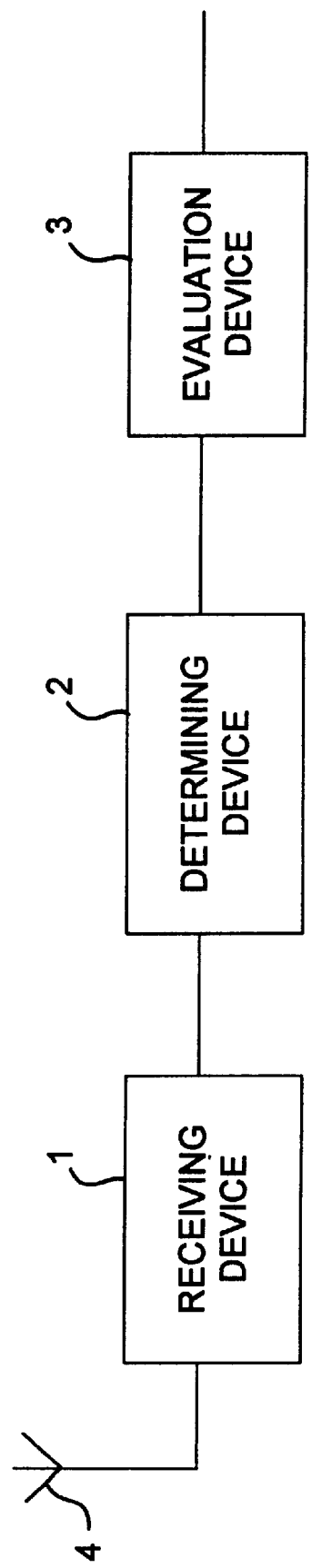
FIG. 1 is a schematic view of an apparatus according to the invention for processing control signals in a mobile station of a mobile radio system.

Referring now to the FIGURE of the drawing in detail, there is seen a receiving device 1, a determining device 2, an evaluation device 3, and an antenna 4 of a mobile station of a mobile radio system. Control signals received from a base station through the antenna 4 are received and amplified in the receiving device 1. The determining device 2 determines the reception level of the control signal (receive signal). In a preferred embodiment, the determining device 2 is an A/D converter. In the evaluation device 3, the reception level of the control signal received from the base station is evaluated. The evaluation device 3 thereby defines a fluctuation value on the basis of the reception level, compares the fluctuation value with a preset threshold value, and effects the reduction or increase in the rate of reception and/or measurement of the reception level of control signals from other base stations if the fluctuation value, defined on the basis of the reception level of the control signal received from the current base station, falls below or exceeds the preset threshold value.

In the ideal state, the modulation value in the A/D converter is in the middle of its logarithmized modulation range, that is, it is at 0 dB. If the reception level of the control signal received from the current base station fluctuates at the antenna or the receiving device 1, then the modulation value in the A/D converter fluctuates as well. The modulation value in the A/D converter of the mobile station is measured at regular intervals for the current base station and converted into dB. The evaluation device 3 in this process defines a fluctuation value, which by way of example may be an envelope curve for the modulation value.

If the modulation value of a measurement exceeds the fluctuation value of the preceding measurement, then the fluctuation value is increased by a first amount. If the modulation value of a measurement falls below the fluctuation value of the preceding measurement, then the fluctuation value is reduced by a second amount. By way of example, the second amount may be $1/20^{th}$ of the applicable fluctuation value. The first amount is always greater than the second amount, and as a result a constant optimal accessibility of the mobile station is assured. The first and the second amounts may also be dependent on the current fluctuation value, so that for instance the first and second amounts are greater when the fluctuation value of a preceding evaluation was higher than when the fluctuation value of the preceding evaluation was lower. If the fluctuation value is thus already at a high value on the basis of the preceding evaluation, then the increase or reduction in the fluctuation value is done in larger increments than if the fluctuation value is at a lower level.

If the fluctuation value falls below the defined threshold value, then the mobile station is switched over from the variable mode, in which the reception level of the control signals of the current base station is regularly compared with the reception levels of the control signals of the other base stations, to a constant static mode. In the constant static mode, the mobile station receives the control signals from other base stations, or measures their reception levels, substantially less often than in the variable mode. In the constant static state, however, the rate of the reception and/or measurement of the reception level of control signals from other base stations can be reduced down to zero, so that in the constant static mode the mobile station receives no further control signals from other base stations and/or no longer measures their reception levels. Alternatively, further threshold values may be introduced; the range between two threshold values in each case corresponds to a certain rate of the reception and/or measurement of the reception level of control signals from other base stations.

It will be appreciated that the method and the apparatus according to the invention can also be used for detecting motion on the part of the mobile station.

I claim:

1. A method of processing control signals in a mobile station of a mobile radio system, in which control signals are received from a current base station and from other base stations, which comprises:

determining and evaluating a reception level of a control signal received from a current base station;

deriving a fluctuation value from the control signal received from the current base station;

comparing the fluctuation value with a preset threshold value;

defining, based on a result obtained in the comparing step, one of a rate of reception and a rate of measuring the reception level of control signals from other base stations;

increasing the fluctuation value by a first amount if the fluctuation value of a preceding evaluation is less than a modulation value of a current evaluation; and reducing the fluctuation value by a second amount, less than the first amount, if the fluctuation value of the preceding evaluation is greater than the modulation value of the current evaluation.

2. The method according to claim 1, wherein the defining step comprises selectively reducing and increasing the rate of reception of the control signals from the other base stations if the fluctuation value is less than the preset threshold value or the fluctuation value exceeds the preset threshold value.

3. The method according to claim 1, wherein the defining step comprises selectively reducing and increasing the rate of measuring the reception level of the control signals from the other base stations if the fluctuation value is less than the preset threshold value or the fluctuation value exceeds the preset threshold value.

4. The method according to claim 1, wherein the step of determining the fluctuation value comprises defining the fluctuation value on the basis of a modulation value, determined in an A/D converter, of the reception level of the control signal received from the current base station.

5. The method according to claim 1, wherein the first amount and the second amount are greater for a higher fluctuation value in the preceding evaluation than for a lower fluctuation value in the preceding evaluation.

6. An apparatus for processing control signals in a mobile station of a mobile radio system receiving control signals from a current base station and from other base stations, comprising:

a receiving device for receiving control signals from a current base station and from other base stations;

a determining device connected to said receiving device for determining a reception level of the control signal received from the current base station;

an evaluation device connected to said determining device for evaluating the reception level, said evaluation device deriving a fluctuation value from the reception level, comparing the fluctuation value with a predetermined threshold value, and defining, based on a result of the comparison, one of a rate of reception of control signals and a measurement of the reception level of the control signals from the other base stations; and said evaluation unit increasing the fluctuation value by a first amount if a modulation value of a preceding evaluation is less than the modulation value of a current evaluation, and said evaluation unit reducing the fluctuation value by a second amount, less than the first amount, if the modulation value of the preceding evaluation is greater than the modulation value of the current evaluation.

7. The apparatus according to claim 6, wherein said evaluation device is programmed to selectively reduce or increase one of the rate of reception and the measurement of the reception level of the control signals from the other base stations if the fluctuation value lies below or exceeds the predetermined threshold value.

8. The apparatus according to claim 7, wherein said evaluation unit increases the fluctuation value by a first amount if the fluctuation value of a preceding evaluation is less than the fluctuation value of a current evaluation, and said evaluation unit reduces the fluctuation value by a second amount if the fluctuation value of the preceding evaluation is greater than the fluctuation value of the current evaluation, whereby the first amount is greater than the second amount.

9. The apparatus according to claim 8, wherein the first and second amounts, for a higher fluctuation value of the preceding evaluation, are greater than for a lower fluctuation value of the preceding evaluation.

10. The apparatus according to claim 6, wherein said determining device is an A/D converter, and said evaluation device defines the fluctuation value from a modulation value of the reception level determined in the A/D converter.

11. The apparatus according to claim 6, wherein the first and second amounts, for a higher modulation value of the preceding evaluation, are greater than for a lower modulation value of the preceding evaluation.

* * * * *